US012786959B2

(12) United States Patent
Gao et al.

(10) Patent No.: US 12,786,959 B2
(45) Date of Patent: Nov. 3, 2026

(54) SENSING INFORMATION ASSISTED BEAM MANAGEMENT

(71) Applicant: ZTE CORPORATION, Shenzhen (CN)

(72) Inventors: Bo Gao, Shenzhen (CN); Zhaohua Lu, Shenzhen (CN); Ke Yao, Shenzhen (CN); Shujuan Zhang, Shenzhen (CN); Chuangxin Jiang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 322 days.

(21) Appl. No.: 18/489,495

(22) Filed: Oct. 18, 2023

(65) Prior Publication Data

US 2024/0049189 A1 Feb. 8, 2024

Related U.S. Application Data

(63) Continuation of application No. PCT/CN2021/112897, filed on Aug. 17, 2021.

(51) Int. Cl.

| | |
|---|---|
| ***H04W 72/04*** | (2023.01) |
| ***H04B 7/06*** | (2006.01) |
| ***H04B 7/08*** | (2006.01) |
| ***H04L 5/00*** | (2006.01) |
| ***H04W 72/21*** | (2023.01) |
| ***H04W 72/231*** | (2023.01) |

(52) U.S. Cl.

CPC .......... *H04W 72/04* (2013.01); *H04B 7/0696* (2023.05); *H04B 7/088* (2013.01); *H04L 5/0048* (2013.01); *H04W 72/21* (2023.01); *H04B 7/06952* (2023.05); *H04W 72/231* (2023.01)

(58) Field of Classification Search

CPC ... H04W 72/04; H04W 72/21; H04W 72/231; H04B 7/0696; H04B 7/088; H04B 7/06952; H04L 5/0048

USPC .......................................................... 370/329

See application file for complete search history.

(56) References Cited

U.S. PATENT DOCUMENTS

| | | | | |
|---|---|---|---|---|
| 2017/0331577 | A1 | 11/2017 | Parkvall et al. | |
| 2019/0045553 | A1 | 2/2019 | Zhang et al. | |
| 2019/0306909 | A1 * | 10/2019 | Zhou | H04W 72/23 |
| 2019/0334599 | A1 | 10/2019 | Davydov | |
| 2019/0364556 | A1 | 11/2019 | Davydov et al. | |
| 2020/0037301 | A1 | 1/2020 | Park | |
| 2020/0252951 | A1 | 8/2020 | Frenne et al. | |
| 2020/0305174 | A1 | 9/2020 | Ganesan et al. | |
| 2022/0046635 | A1 * | 2/2022 | Liou | H04B 7/0691 |

FOREIGN PATENT DOCUMENTS

WO WO-2025034848 A1 * 2/2025 ........... H04L 5/0037

OTHER PUBLICATIONS

3GPP TS 38.305 V15.8.0 (Mar. 2021) (Year: 2021).*

(Continued)

*Primary Examiner* — Asad M Nawaz

*Assistant Examiner* — Hugh Mark Ashley

(74) *Attorney, Agent, or Firm* — Foley & Lardner LLP

(57) ABSTRACT

Presented are systems, methods, apparatuses, or computer-readable media for performing sensing information assisted beam management. A wireless communication device may receive, from a wireless communication node, a first signaling that includes a transmission parameter setting. The wireless communication device may associate the transmission parameter setting and resource related information. The wireless communication device may communicate with the wireless communication node, a signal according to the resource related information.

19 Claims, 8 Drawing Sheets

(56) References Cited

OTHER PUBLICATIONS

Extended European Search Report for EP Appl. No. 21953668.7, dated May 7, 2024 (10 pages).
Futurewei, "Enhancement on multi-beam operation", R1-2107085. 3GPP TSG RAN WG1 Meeting #106-e. e-Meeting, Aug. 16, 2021 (13 pages).
International Search Report and Written Opinion for PCT Appl. No. PCT/CN2021/112897, mailed May 19, 2022 (9 pages).
Moderator (Samsung), "Moderator summary #2 for multi-beam enhancement: Round 1", R1-2108325, 3GPP TSG RAN WG1 #106-e, e-Meeting, Aug. 16, 2021 (27 pages).
Nokia, et al., "Enhancements for HST-SFN deployment", R1-2105276, 3GPP TSG RAN WG1 #105-e, e-Meeting, May 10, 2021 (13 pages).
Nokia, et al., "Enhancements on Multi-beam Operation", R1-2105273, 3GPP TSG RAN WG1 #105-e, e-Meeting, May 10, 2021 (44 pages).
NTT Docomo, Inc, "Discussion on multi-beam operation", R1-2105683, 3GPP TSG RAN WG1 #105, e-Meeting, May 10, 2021 (17 pages).
Vivo, "Further discussion on multi beam enhancement", R1-2106571, 3GPP TSG RAN WG1 #106-e, e-Meeting, Aug. 16, 2021 (30 pages).
3rd Generation Partnership Project; Technical Specification Group Radio Access Network; NR; Radio Resource Control (RRC) protocol specification (Release 15), 3GPP TS 38.331 V15.14.0 (Jun. 2021), 540 pages.
Office Action for KR Appl. No. 10-2023-7036051, dated Dec. 17, 2025 (with English translation, 12 pages).

* cited by examiner

SENSING INFORMATION ASSISTED BEAM MANAGEMENT

CROSS-REFERENCE TO RELATED APPLICATION

This application claims the benefit of priority under 35 U.S.C. § 120 as a continuation of International Patent Application No. PCT/CN2021/112897, filed on Aug. 17, 2021, the disclosure of which is incorporated herein by reference in its entirety.

TECHNICAL FIELD

The disclosure relates generally to wireless communications, including but not limited to systems and methods for performing sensing information assisted beam management.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, a method, an apparatus, or a computer-readable medium for performing sensing information assisted beam management. A wireless communication device may receive, from a wireless communication node, a first signaling that includes a transmission parameter setting. The wireless communication device may associate the transmission parameter setting and resource related information. The wireless communication device may communicate with the wireless communication node, a signal according to the resource related information.

At least one aspect is directed to a system, a method, an apparatus, or a computer-readable medium for performing sensing information assisted beam management. A wireless communication device may receive, from a wireless communication node, a first signaling that includes a transmission parameter setting. The wireless communication device may associate the transmission parameter setting and resource related information. The wireless communication device may communicate, with the wireless communication node, a signal according to the transmission parameter setting.

In some embodiments, the signal may include at least one of a downlink signal or an uplink signal. In some embodiments, the transmission parameter setting may represent sensing information associated with an anchor, for assisting beam determination by the wireless communication device. In some embodiments, the transmission parameter setting may include at least one of: location information, size information or a range of angles. In some embodiments, the anchor may include a virtual anchor or a physical anchor.

In some embodiments, the location information may include at least one of: a location of an anchor, a location of a reflector, or a location of a blockage. In some embodiments, the size information may include at least one of a radius or a length; or size information of an anchor, a reflector, or a blockage. In some embodiments, the range of angles may include at least one of: an available range of angles of at least one of: an anchor; or at least one of a range of an angle of arrival (AoA), or a range of an angle of departure (AoD).

In some embodiments, the transmission parameter setting may include sensing information related to each of a plurality of sub-entities of an anchor, the sensing information comprising at least one of: location information, size information or a range of angles. In some embodiments, the transmission parameter setting may include spread information that corresponds to location information, spread information that corresponds to size information or spread information that corresponds to angle.

In some embodiments, the spread information that corresponds to angle may include angular spread. In some embodiments, the angular spread may include at least one of: azimuth angle spread of arrival, zenith angle spread of arrival, azimuth angle spread of departure, or zenith angle spread of departure.

In some embodiments, the first signaling may include: system information block (SIB) signalling, master information block (MIB) signalling, medium access control control element (MAC-CE) signalling or radio resource control (RRC) signalling. In some embodiments, the resource related information may include at least one of: a reference signal (RS), a beam state, group information, a reporting configuration, a bandwidth part (BWP), a component carrier (CC), a control resource set (CORESET) pool, or an uplink power control parameter.

In some embodiments, the RS may include at least one of: a RS port, a RS port group, a RS resource, a RS resource set, or a RS resource setting. In some embodiments, the RS may include synchronization signal blocks (SSBs) or channel state information reference signals (CSI-RSs). In some embodiments, the transmission parameter setting may be associated with a group of the RSs. In some embodiments, the RS may be associated with a plurality of transmission parameter settings.

In some embodiments, the wireless communication device may communicate the RS. The RS may be configured with the beam state or the group information, and the beam state or the group information may be associated with the transmission parameter setting. In some embodiments, a measurement corresponding to the reporting configuration may be performed according to the transmission parameter setting.

In some embodiments, the transmission parameter setting may be selected from a pool of transmission parameter settings. In some embodiments, the first signaling may include a pool of transmission parameter settings comprising one or more transmission parameter settings. In some embodiments, the wireless communication device may receive a second signaling to activate a subset of a pool of beam states In some embodiments, the second signaling may associate a plurality of beam states with a codepoint. The plurality of beam states may be associated with at least one transmission parameter setting. In some embodiments, the plurality of beam states may include a first plurality of beam states to be applied to downlink signals, and a second plurality of beam states to be applied to uplink signals.

In some embodiments, the wireless communication device may receive a third signaling to indicate a beam state from the subset, the indicated beam state to be applied to at least one of: downlink signaling or uplink signaling. In some embodiments, the wireless communication device may determine a plurality of transmission parameter settings associated with the indicated beam state. In some embodiments, the wireless communication device may determine a first transmission parameter setting from the plurality of transmission parameter settings, that is effective and to be applied to the signal.

In some embodiments, the signal may include a reference signal (RS) associated with the transmission parameter setting. The RS may be used for at least one of beam detection, radio link monitoring, candidate beam identification, beam recovery or link recovery. In some embodiments, the wireless communication device may send a report. The report may include at least one of: a failure event corresponding to a reference signal (RS) or the transmission parameter setting; a recovery event corresponding to the RS or the transmission parameter setting; an indication of the RS or the transmission parameter setting, or a time stamp for beam failure or beam recovery; or channel state information (CSI) corresponding to the RS or the transmission parameter setting.

In some embodiments, the report may include at least one of an uplink control information (UCI) signaling, a medium access control control element (MAC-CE) signaling or a radio resource control (RRC) signalling. In some embodiments, the RS may correspond to a failed RS or a candidate RS, or the transmission parameter setting may correspond to a failed transmission parameter setting or a candidate transmission parameter setting.

In some embodiments, the CSI at least may meet a threshold. In some embodiments, the report may include an indication that a candidate RS or a candidate transmission setting is absent. In some embodiments, the wireless communication device may receive a downlink signal according to the RS or the transmission parameter setting.

In some embodiments, a beam state, spatial relation, spatial domain filter, or group information of the downlink signal may be determined according to the RS or the transmission parameter setting. In some embodiments, the wireless communication device may transmit an uplink signal according to the RS or the transmission parameter setting.

In some embodiments, a beam state, spatial relation, group information or spatial domain filter of the uplink signal may be determined according to the RS or the transmission parameter setting. In some embodiments, the wireless communication device may receive another signaling, the another signaling comprises a downlink control information (DCI) signaling, a medium access control control element (MAC-CE) signaling or a radio resource control (RRC) signaling.

At least one aspect is directed to a system, a method, an apparatus, or a computer-readable medium for performing sensing information assisted beam management. A wireless communication node may transmit, to a wireless communication device, a first signaling that includes a transmission parameter setting. The wireless communication node may cause the wireless communication device to associate the transmission parameter setting and resource related information. The wireless communication node may communicate, with the wireless communication device, a signal according to the resource related information.

At least one aspect is directed to a system, a method, an apparatus, or a computer-readable medium for performing sensing information assisted beam management. A wireless communication node may transmit, to a wireless communication device, a first signaling that includes a transmission parameter setting. The wireless communication node may cause the wireless communication device to associate the transmission parameter setting and resource related information. The wireless communication node may communicate, with the wireless communication device, a signal according to the transmission parameter setting.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

1. Mobile Communication Technology and Environment

Figure 1:
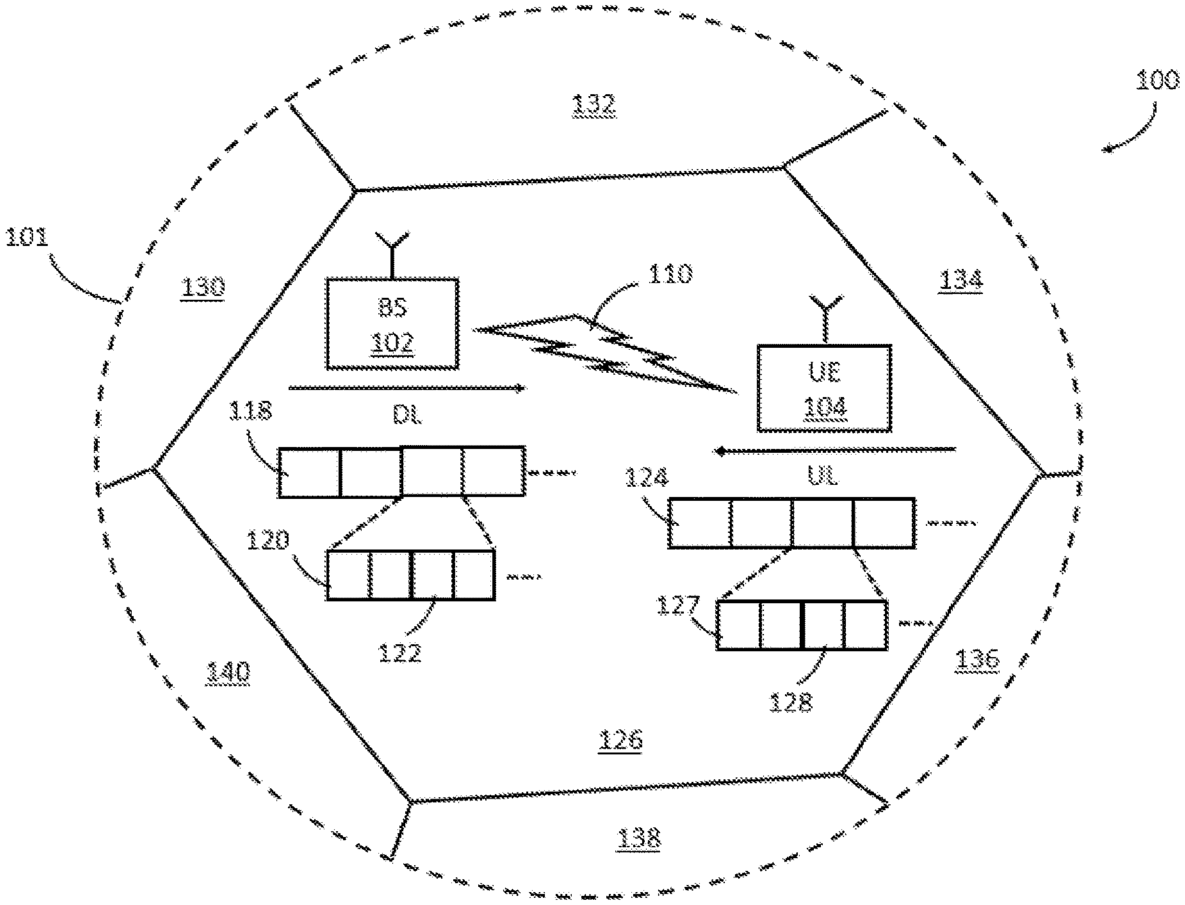
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
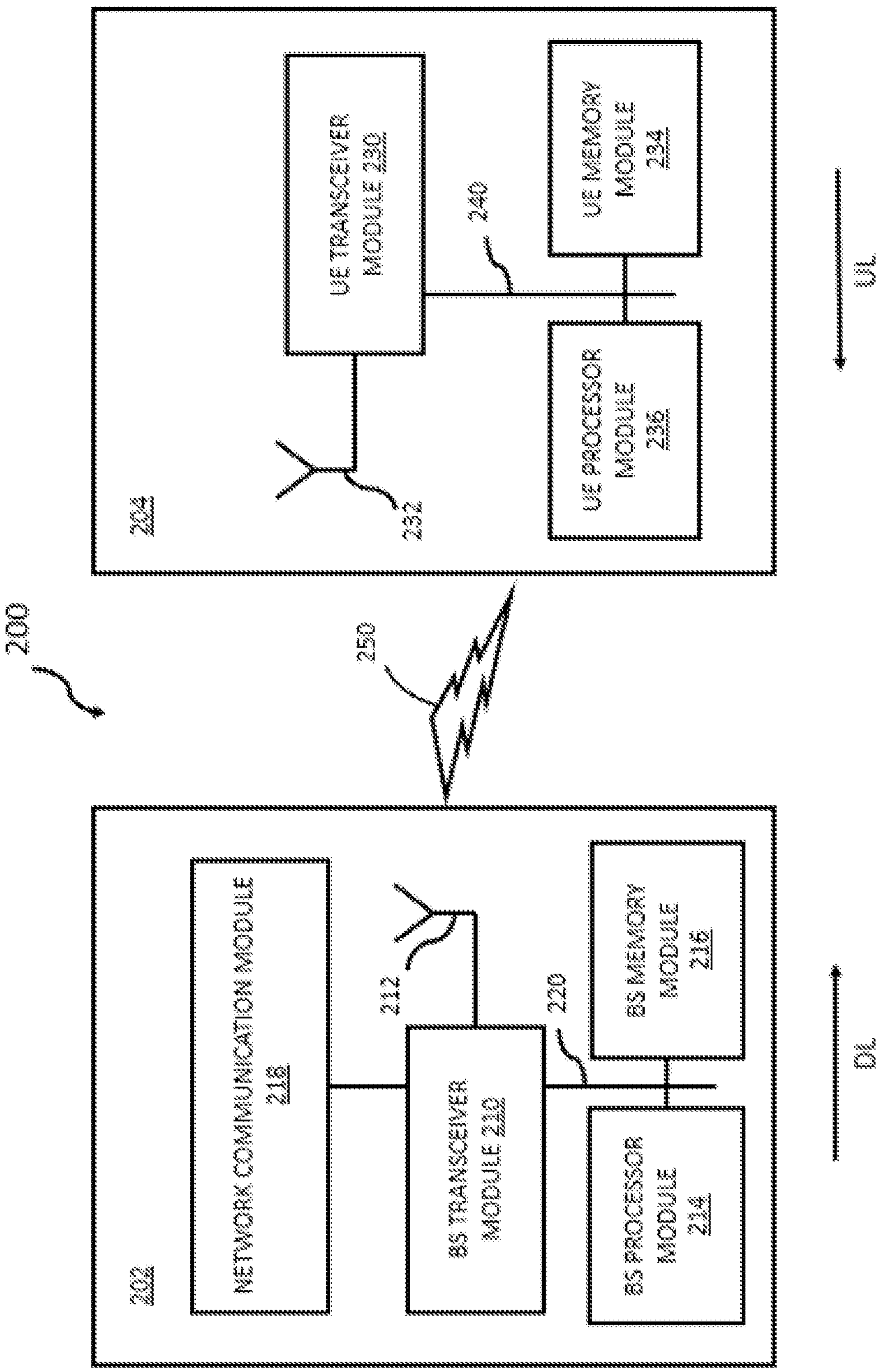
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods for Performing Sensing Information Assisted Beam Management Presented herein are systems and methods for sensing-information-assisted beam management in massive beam architecture. The approaches detailed herein may accelerate beam training and tracking procedure, save RS overhead, and improve link robustness under a narrow beam. Firstly, a new definition of sensing-information may be specified to represent or describe real and/or virtual anchor(s), line-of-sight (LOS) and non-line-of-sight (NLOS) path(s), physical reflector(s) and/or gNB/UE location(s). Then, this sensing-information may be associated with beam management for supporting the corresponding procedure. Finally, the living and death procedure related to a physical/spatial/communication path can be predicted based on the sensing information (e.g., virtual anchor), and then a mechanism enabling NW/UE to provide advance notifications about predicted quality of service (QoS) changes may be considered. For example, some related event(s) can be reported in advance before beam link failure occurs.

In 5G new radio (NR), analog beam-forming may be introduced into mobile communication for guaranteeing the robustness of high frequency communications. For a downlink (DL) transmission, quasi-co location (QCL) state (also called transmission configuration indicator (TCI) state or beam state) may be used for supporting beam indication for DL control channel (e.g., physical downlink control channel (PDCCH)), DL data channel, (e.g., physical downlink sharing channel (PDSCH)), and channel-state-information reference signalling (CSI-RS), among others.

Similarly, for a uplink (UL) transmission, spatial relation information (the corresponding higher layer parameter may also be called as spatialRelationInfo) may be used for supporting beam indication for UL control channel (e.g., physical uplink control channel (PUCCH)), and sounding reference signal (SRS). Besides, beam indication for UL data channel (e.g., physical uplink shared channel (PUSCH)), may be achieved through mapping with one or more SRS resources. The SRS resources may be indicated by gNB, and ports of the UL data channel. The beam configuration for UL data channel can be derived from the spatial relation information associated with SRS resources or ports accordingly. Then, a unified TCI framework can be introduced, and based on the framework, a single TCI state can be applied to both or either of DL signalling (e.g., PDSCH, PDCCH and CSI-RS) and UL signalling (e.g., PUSCH, PUCCH, and SRS) for determining the corresponding transmission and receiver (Tx/Rx) beam(s).

Although various approaches under 5G NR with flexible configuration are applicable for different scenarios, the RS overhead can increase rapidly with the increase of candidate beams introduced by massive antenna elements and panels in both gNB and UE sides. Meanwhile, link robustness may be degraded seriously due to lack of spatial diversity with the pair of narrower Tx and Rx beam(s). For instance, when the number of gNB antenna elements increase from 8*4 to 32*32, the number of candidate Tx beams to be probed in beam training may increase from 32 to 1024, and the effective beam-width for horizontal and vertical domain may decrease from 22.5 to 5.625 degrees, and from 45 to 5.625 degrees, respectively. Then, as a result, the corresponding RS overhead for supporting beam training may increase significantly.

To save RS overhead and use narrow beam pair(s) for subsequent data transmission with sufficient beam-forming gain, the procedure of beam management may be improved accordingly. Through sensing wireless environment, much of the information related to gNB/UE location, reflectors, blockage may be obtained in advance for performing sensing-information-assisted beam management. The following issues may be handled.

First, the definition of sensing-information may be considered. Specifically, to make this sensing-information general rather than case-by-case, which types of sensing parameters that are to play a key role of depicting wireless channel quality can be identified effectively. For instance, the definition of real and virtual anchor(s) may be introduced for describing LOS/NLOS path such as, to describe a location and the scope of an available Tx beam corresponding to an anchor, respectively.

Second, the framework of associating sensing-information with beam management may be reconsidered for accelerating beam alignment or beam tracking. Then, an associating mechanism between sensing information and beam measurement, reporting and indication may be considered, and the corresponding signaling design may be developed accordingly.

Third, the living and death procedure related to a physical path (e.g., in contrast with a virtual path extending from a virtual anchor) can be predicted based on the sensing information (e.g., virtual anchor), and then a mechanism enabling NW/UE to provide advance notifications about predicted QoS changes may be considered. For example, some related events can be informed of/to the gNB side, in advance before an actual beam link failure occurs.

I. Context Regarding Beam Forming Management

Figure 3:
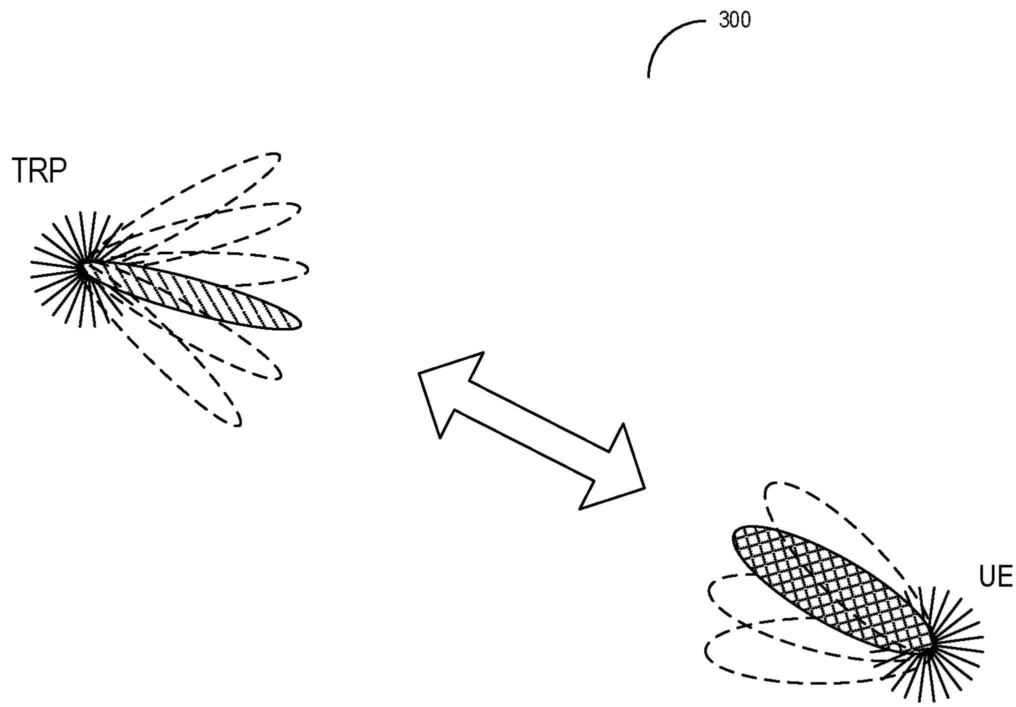
FIG. 3 illustrates a block diagram of an environment for beam-based uplink (UL) and downlink (DL) transmissions in accordance with an illustrative embodiment.

Referring now to FIG. 3, depicted is a block diagram of an environment 300 for beam-based uplink (UL) and downlink (DL) transmissions. In the depiction, the full, solid lines may represent the selected Tx/Rx beams for communications. As the expense of wide or ultra-wide spectrum resources, the considerable propagation loss induced by the extremely high frequency may become a noticeable challenge. To solve this, antenna array and beam-forming training technologies using massive MIMO (e.g., up to 1024 antenna elements for one node) may be used to achieve beam alignment and obtain sufficiently high antenna gain. To keep low implementation cost while still benefiting from the antenna array, analog phase shifters may become very attractive for implementing mmWave beam-forming. As such, the number of controllable phases may be finite and the constant modulus constraints may be placed on these antenna elements. Given the pre-specified beam patterns, the variable-phase-shift-based BF training targets may identify the best pattern for subsequent data transmission in general, in the one-transmission/reception point (TRP) and one-panel case.

For context, a "beam state" may be equivalent to quasi-co-location (QCL) state, transmission configuration indicator (TCI) state, spatial relation (also called as spatial relation information), reference signal (RS), spatial filter or pre-coding. Furthermore, "beam state" may be also called as "beam". A "Tx beam" may be equivalent to QCL state, TCI state, spatial relation state, DL reference signal, UL reference signal, Tx spatial filter or Tx precoding. An "Rx beam" may be equivalent to QCL state, TCI state, spatial relation state, spatial filter, Rx spatial filter or Rx precoding. A "beam ID" is equivalent to QCL state index, TCI state index, spatial relation state index, reference signal index, spatial filter index or precoding index. The spatial filter can be either UE-side or gNB-side one, and the spatial filter can also be called as spatial-domain filter.

Furthermore "spatial relation information" may be comprised of one or more reference signal (RSs). The RSs may be used to represent the same or quasi-co "spatial relation" between targeted "RS or channel" and the one or more reference RSs. The "spatial relation" may correspond to the beam, spatial parameter, or spatial domain filter.

A "QCL state" may be comprised of one or more reference RSs and their corresponding QCL type parameters, where QCL type parameters include at least one of the following aspect or combination, including: Doppler spread, Doppler shift, delay spread, average delay, average gain, and spatial parameter (also called spatial Rx parameter). "TCI state" may be equivalent to "QCL state". In addition, there may be different types of QCLs: (1) "QCL-TypeA:" {Doppler shift, Doppler spread, average delay, delay spread}; "QCL-TypeB" {Doppler shift, Doppler spread}; "QCL-TypeC" {Doppler shift, average delay}; and "QCL-TypeD" {Spatial Rx parameter}.

A RS may include channel state information reference signal (CSI-RS), synchronization signal block (SSB) (also called as synchronization signal, physical broadcast channel (SS/PBCH)), demodulation reference signal (DMRS), sounding reference signal (SRS), and physical random access channel (PRACH). Furthermore, the RS may include DL reference signal and UL reference signalling, among others. A DL RS may include CSI-RS, SSB, DMRS (e.g., DL DMRS). A UL RS may include SRS, DMRS (e.g., UL DMRS), and PRACH, among others. "UL signal" can include PUCCH, PUSCH, or SRS. "DL signal" can include PDCCH, PDSCH, or CSI-RS.

A group based reporting may include at least one of "beam group" based reporting and "antenna group" based reporting. A "beam group" may be that different Tx beams within one group can be simultaneously received or transmitted, or Tx beams between different groups not simultaneously received or transmitted. Furthermore, the "beam group" may be described from the UE perspective.

An "antenna group" may include/represent or correspond to different Tx beams within one group that may not be simultaneously received or transmitted, or Tx beams between different groups that can be simultaneously received or transmitted. Furthermore, the "antenna group"

may include more than N different Tx beams within one group that may not be simultaneously received or transmitted, or no more than N different Tx beams within one group that can be simultaneously received or transmitted, where N is positive integer. The "antenna group" may correspond to Tx beams between different groups can be simultaneously received or transmitted. The "antenna group" is described from the UE perspective. The antenna group may be equivalent to antenna port group, panel or UE panel. Furthermore, antenna group switching may correspond to panel switching.

The "group information" may include/represent or correspond to "information grouping one or more reference signals", "resource set", "panel", "sub-array", "antenna group", "antenna port group", "group of antenna ports", "beam group", "transmission entity/unit", or "reception entity/unit", among others. Furthermore, the "group information" may represent the UE panel and some features related to the UE panel. The "group information" may correspond to "group state" or "group ID".

An anchor comprises a virtual anchor or a physical anchor. Furthermore, an "anchor" may be equivalent to a transmission point, receive point, site, reference signal (RS), spatial filter or pre-coding, among others. The UL power control parameter may include at least one of target power (also called as P0), path loss RS (also called as coupling loss RS), scaling factor for path loss (also called as alpha), and closed loop process, among others. A CSI may comprise at least one of reference signal receive power (RSRP), signal to noise and interference ratio (SINR), receive signal strength indicator (RSSI), reference signal received quality (RSRQ), channel quality indicator (CQI), and precoding matrix indicator (PMI).

II. Transmission Parameter Setting for Representing Sensing Information

To depict a wireless channel under a given scenario (e.g., in a living room or in a dense urban), the wireless ray-tracing (radio path map) may be widely used. For communication, however, the benefits of ray-tracing technique based on a real-time radio path map for a UE may be unclear due to the cost. Alternatively, a LOS path which can be emulated well according to the position of UE and TRP may be considered. The diversity and multiplexing gain, however, contributed by NLOS paths may be lost. Therefore, a trade-off between accuracy and complexity to representing a wireless environment may be considered.

Figure 4:
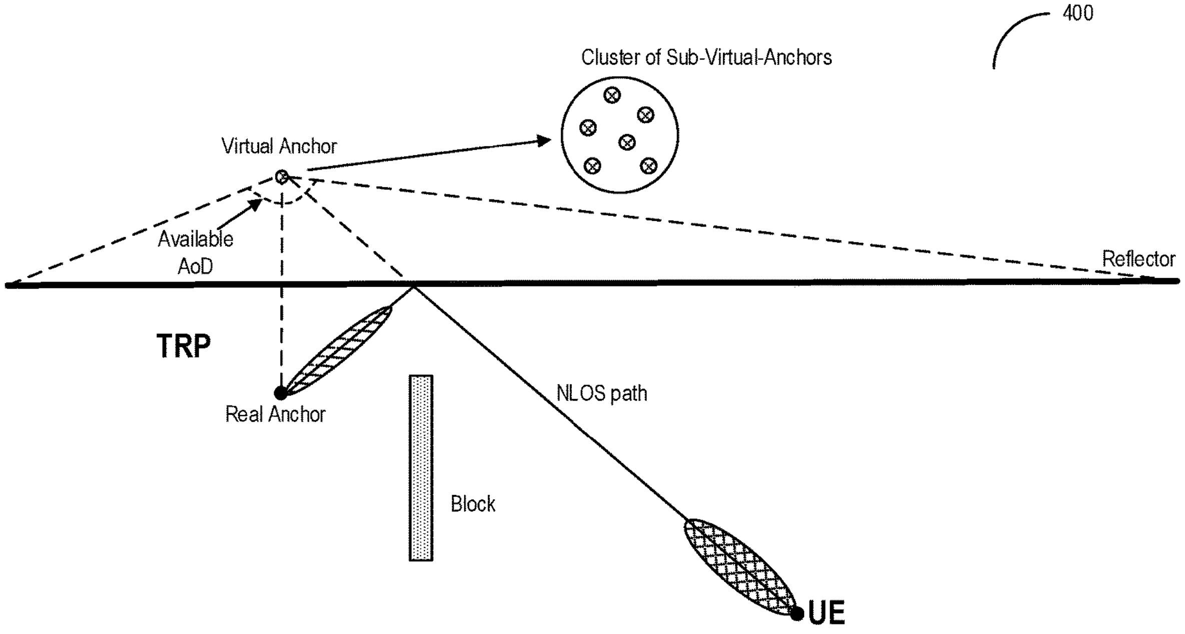
FIG. 4 illustrates a block diagram of a system for a virtual anchor in assisting beam management in accordance with an illustrative embodiment.

Referring now to FIG. 4, depicted is a block diagram of a system 400 for a virtual anchor in assisting beam management. A definition of a virtual anchor to balance/address the above issues is introduced as a key aspect/point of sensing information. The real or physical anchor may refer to a gNB/TRP, and then the virtual anchor may refer to a virtual object corresponding to the first-order or high-order reflection associated with the real/physical anchor.

For millimeter-wave communication, the path loss due to diffraction and scattering may be much larger than regular reflection. Considering the dominant recover power, the LOS and first-order (and sometimes, second-order) reflection paths may be considered for wireless transmission, although the emulation accuracy of physical channel may be degraded slightly.

Consequently, a virtual anchor (VA) corresponding to regular reflection may be introduced for beam management. Specifically, the virtual anchor may have its own location and an available range of angle of departure (AoD), in accordance with the reflector theory. To further emulate physical channel much more accurately, considering that the reflector may not be smooth, the virtual anchor may be assumed/represented as an area (e.g., rather than a point source) or a cluster of sub-anchors rather than a single one.

Based on advanced techniques (such as pre-measurement, positioning or artificial intelligence (AI)), the UE, TRP (e.g., real anchor referred to a site) and VA locations may be pre-determined or can be estimated in advance. VA related information (e.g., location, range of available AoD), and additional information related to sub-VAs (e.g., distribution area in terms of location or angle-domain, number of sub-VAs), may be used to perform beam refinement and tracking procedure.

The beam refinement and tracking procedure can be accelerated, especially for NLOS paths and massive multiple input, multiple output, reconfigurable intelligence surfaces (MIMO/RIS). For instance, multiple paths may be identified for different pairs of UE panel and TRP (e.g., group based reporting);

The living and death procedure (e.g., procedure triggered by connected/active state or disconnected/off/inactive state) related to a physical path of a link can be estimated and predicted. A mechanism enabling NW/UE may provide advance notifications about predicted QoS changes to interested consumers or predicted beam/TRP changes. This makes it possible to adjust application behavior before the living and death procedure of a path takes effect. This may have applications in certain automotive use cases, such as remote and autonomous driving.

Compared with emulating radio path map based on ray-tracing technique, UE complexity for emulating a NLOS path based on VA can be reduced significantly. Considering some estimation error due to the (VA-related) method, some additional real-field tests along with the NLOS path estimate (e.g., some neighboring beams) may be used, such as in/for beam refinement/tracking.

The TRP may be virtualized as a VA for assisting UE beam determination. The UE may receive a configuration signalling (e.g., from the gNB/BS) including a transmission parameter setting for representing sensing information (e.g., VA (location) and the scope of a reflector). The transmission parameter setting may include at least one of: location information, a range of available angles, and size information, among others. Furthermore, the location information may include the location of a site or VA (e.g., center location), and the location of a reflector or a block/blockage (along a potential radio transmission path). Furthermore, the size information may include at least one of radius, and length (e.g., in horizontal or vertical domain, or in 2D or 3D). Furthermore, the size information may include size information of the site or VA (e.g., centric location), reflector or block/blockage. Furthermore, the available angle may include the available angle of site or VA. Furthermore, the angle may include at least one of angle of arrival (AoA), or angle of departure (AoD). AoA may include at least one of: azimuth angle of arrival and zenith angle of arrival. AoD may include at least one of: azimuth angle of departure and zenith angle of departure.

There may be multiple virtual cells for a given cell due to a reflector (e.g., reconfigurable intelligent surface, RIS). The VA can be defined with a center location and a range (e.g., with a radius of 20 cm). For instance, the scope of a reflector may correspond to the physical channel without any blockage, which can be defined from the VA's perspective (e.g., available AOD scope).

The transmission parameter setting may include a number of sub-VA or site related information. Each of the sub-VA/site related information may include at least one of: location information, a range of available angles, and size information, among others. In some embodiments, the transmission parameter setting may include a spread information. The spread information may correspond to the location information or angle (e.g., location spread, or angle spread), among others.

The spread information corresponding to angle may correspond to angular spread. In some embodiments, the spread information corresponding to angle may include: azimuth angle spread of arrival, zenith angle spread of arrival, azimuth angle spread of departure and zenith angle spread of departure, among others. Furthermore, the configuration signalling may include SIB, MIB, MAC-CE or RRC signalling, among others.

III. Beam Measurement Configuration for Enabling Sensing-Information-Assisted Beam Management.

To enable sensing-information-assisted beam management, one or more transmission parameter settings for representing sensing information may be associated with the various aspects.

In some embodiments, the one or more transmission parameter settings may be associated with a RS. The RS may include: RS port, RS port group, RS resource, RS resource set, and RS resource setting, among others. In some embodiments, the RS may include SSBs or CSI-RSs, and the transmission parameter setting may be associated with a group of SSBs and CSI-RSs. In some embodiments, the RS may include CSI-RS, and the transmission parameter setting may be associated with or included in a CSI-RS resource set. In such case, the one or more RS resources in the set may be associated with the transmission parameter setting (e.g., a VA). The UE can determine course beam alignment based on the location of VA and its own location. Based on the course information, the UE can probe the channel corresponding to the set of CSI-RS. In some embodiments, one RS may be associated with multiple transmission parameter settings, meaning that multiple candidate physical paths (e.g., LOS or NLOS through the VA) can be considered.

In some embodiments, the transmission parameter setting may be associated with or included in the beam state or group information. When the RS is configured with the beam state or group information, the configuration may indicate that the transmission parameter setting can be used for coarse Tx/Rx beam determination. For instance, the beam state can be dynamically indicated or activated. As a result, the RS measurement can dynamically switched to be based on different transmission parameter settings.

In some embodiments, the transmission parameter setting may be associated with TRP related information. Furthermore, the TRP related information may include CORESET pool ID, and RS resource set or setting ID. In some embodiments, the transmission parameter setting may be associated with reporting configuration. Furthermore, the reporting configuration may be associated with the transmission parameter setting. Corresponding measurement(s) may be based on the transmission parameter setting (e.g., based on VA or reflector). In some embodiments, the transmission parameter setting may be associated with a bandwidth part (BWP) or component carrier (CC). In some embodiments, the transmission parameter setting may be associated with a UL power control parameter.

Figure 5:
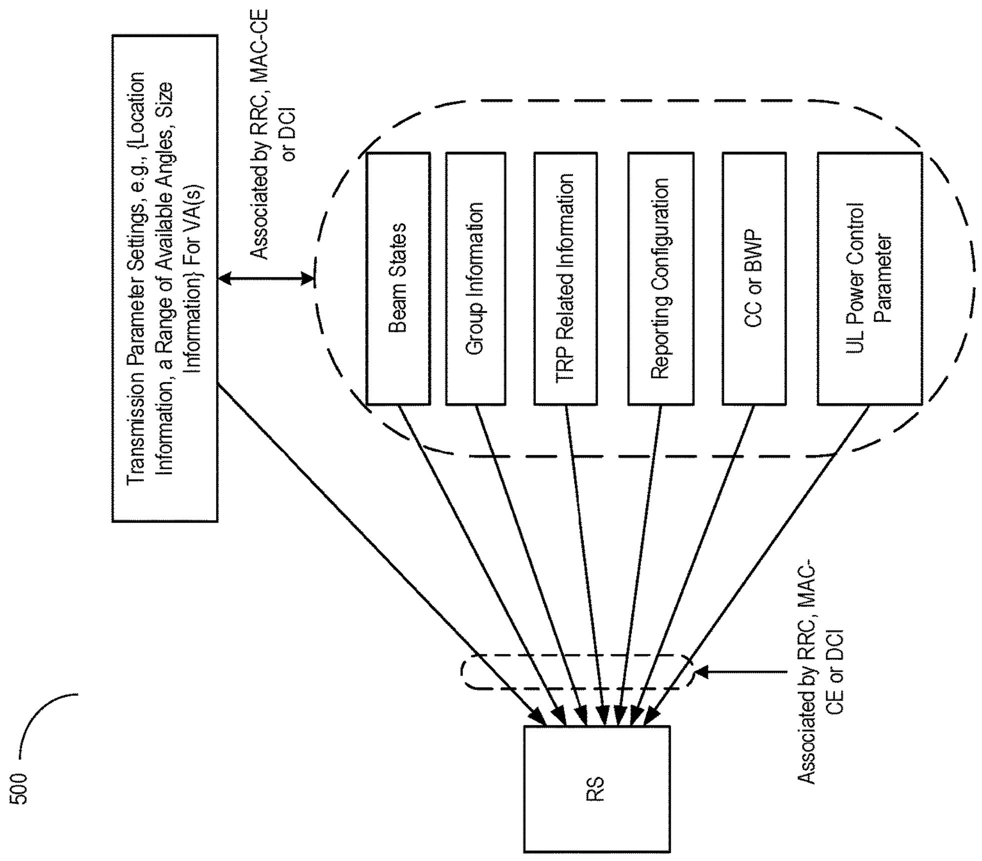
FIG. 5 illustrates a block diagram of a system for beam management configuration through associating with transmission parameter settings in accordance with an illustrative embodiment.

Referring now to FIG. 5, depicted is a block diagram of a system 500 for beam management configuration through associating with transmission parameter settings. In some embodiments, the transmission parameter setting may be associated with uplink (UL) power control parameter (e.g., path loss RS). Furthermore, the transmission parameter setting may be selected from a pool of transmission parameter settings (e.g., configured by RRC signalling). The association may be indicated by another RRC, MAC-CE or DCI signalling (e.g., from the gNB/B S to the UE). In some embodiments, one or more transmission parameter settings may be associated with beam states, group information, TRP related information, reporting configuration, component carrier (CC), bandwidth part (BWP), or UL power control parameter, among others. When RS is configured for or with at least one of beam states, group information, TRP related information, reporting configuration, CC, BWP, or UL power control parameter, the corresponding one or more transmission parameter settings may be applied to the RS.

IV. Beam State Related Configuration with Sensing-Information.

In this embodiments, a beam state may be used to determine the spatial domain filter of UE side. Meanwhile, the sensing information may be relevant to how to assist the UE in accelerating beam refinement and measurement. Through associating the beam state with one or more transmission parameter settings, the transmission parameter setting can be dynamically applied to RS or beam measurement, or to subsequent data transmission. Furthermore, a pool of transmission parameter settings may be pre-configured by RRC signalling, and meanwhile a pool of beam state(s) can be preconfigured via RRC signalling.

Then, via MAC-CE signalling, one TCI state may be activated and can be associated with one or more transmission parameter settings. When multiple transmission parameter settings are provided, one or more sites or VAs may serve the UE. It may be useful for UE to do beam refinement and determine life and death procedure as discussed in Section V. In some embodiments, in a MAC-CE, multiple beam states may be associated with a codepoint, and the one or more transmission parameter settings can be associated with the multiple beam states. The multiple beam states may include several groups, such as a first group of beam states to be applied to DL signals and a second group of beam states to be applied to UL signals. Each of one or more transmission parameter setting may be associated with one of the several groups, respectively.

Finally, via a DCI command, one beam state (e.g., TCI codepoint) may be indicated and is applied to both of or either of DL and UL signaling. For instance, when one TCI state to be applied to DL or UL signal may include multiple transmission parameter settings. The UE can determine which transmission parameter settings are effective due to the fact that some VAs may be blocked or out of its effective range. Accordingly, the UE can refine or adjust its Rx/Tx beams well.

Figure 6:
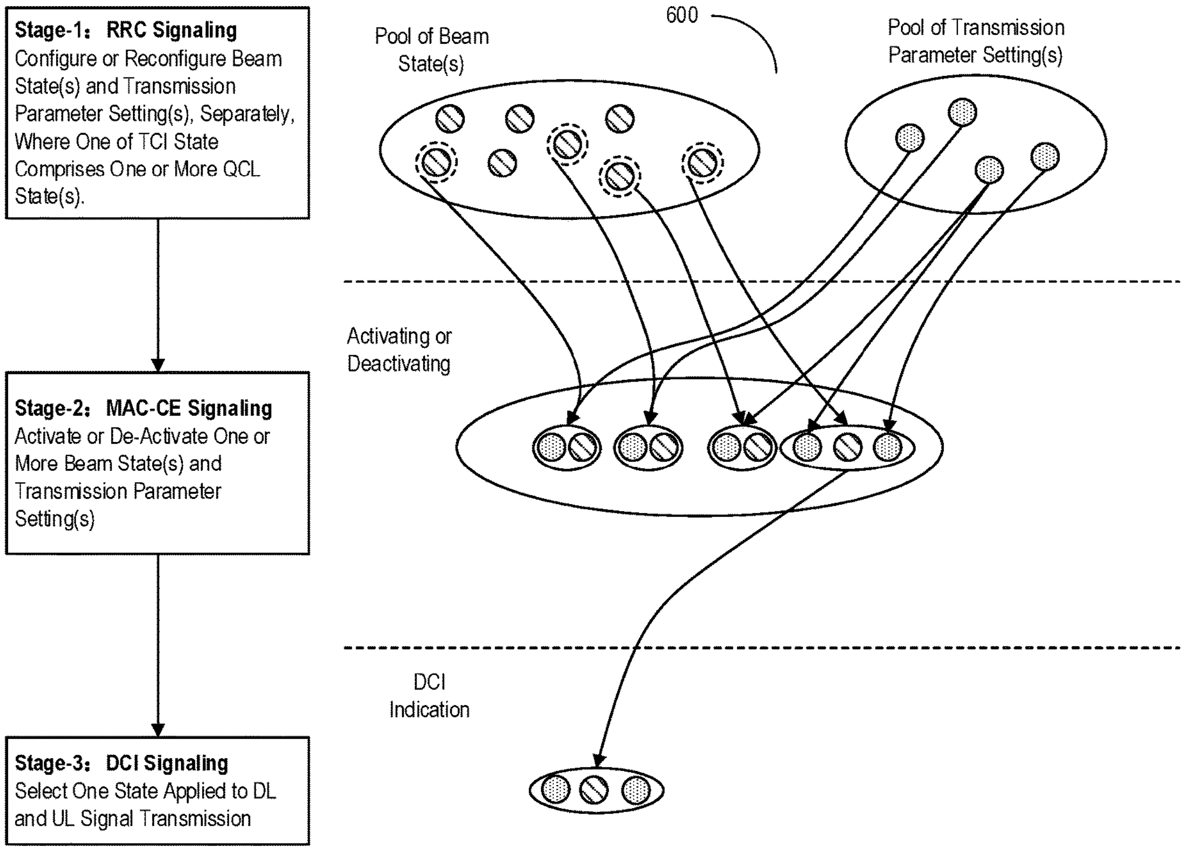
FIG. 6 illustrates a block diagram of a system for beam state related configuration with sensing-information in accordance with an illustrative embodiment.

Referring now to FIG. 6, depicted is a block diagram of a system 600 for beam state related configuration with sensing-information. As depicted, firstly, by RRC signaling from the gNB/BS, the UE may be configured or reconfigured with beam/TCI state(s) and transmission parameter setting(s), separately (Stage 1). One of the TCI states may include one or more QCL state(s). Then, via MAC-CE signaling, the UE may be activated or de-activated with one or more TCI state(s) and transmission parameter setting(s) (Stage 2). The mapping between transmission parameter setting(s) and beam state may be determined by the MAC-CE. Finally, one of the activated beam states may be indicated by DCI and applied to both DL and UL signal (Stage 3).

V. Event Reporting for Living and Death Procedure of Beam and Physical Links

The beam failure recovery and radio-link monitoring may be based on the RS measurement. To be more specific, when the channel quality of the corresponding RS is inferior to the given threshold, beam failure recovery and radio link re-establishment procedure may be triggered. Although this procedure is event-driven and has lower latency compared with gNB scheduling, the radio link may have experienced a serious performance loss. If the transmission parameter setting for representing sensing information is provided, the UE side can predict some potential performance/QoS loss and provide some alarm to gNB side.

RS for candidate beam identification, beam recovery, link recovery, beam detection, including beam failure detection or beam effective detection, or radio link monitor can be associated with one or more transmission parameter setting. In some embodiments, based on the transmission parameter setting, the UE can predict when or whether some beam pair link may be blocked or out of the range of an available angle corresponding to a site (e.g., physical anchor) or virtual anchor. In some embodiments, based on the transmission parameter setting, the UE can predict when or whether some beam pair link that has been blocked or out of the range of an available angle corresponding to a site or virtual anchor are recovered automatically.

The UE can report the failure event corresponding to RS or transmission parameter setting via a UCI, MAC-CE or RRC signaling (e.g., failure event of virtual anchor or TRP), to a gNB/BS for instance. The report may indicate the index corresponding to failed RS or transmission parameter setting or time stamp of a predicted failure. In some embodiments, the report may indicate the recommended RS or recommended transmission parameter setting for assisting the subsequent beam management and data transmission. In some embodiments, the report may include the channel state information (CSI) corresponding to the recommended RS or transmission parameter setting In some embodiments, the channel state information (CSI) corresponding to the recommended RS or recommended transmission parameter setting may be superior to or not inferior to a threshold. In some embodiments, the reporting may indicate that no recommended RS or recommended transmission parameter setting is found, to handle the case that there is no candidate solution for recovery.

When the UE receives the gNB response (e.g., a DCI, MAC-CE or RRC command), the DL signal(s) may be received according to recommended RS or transmission parameter setting. The QCL assumption, spatial domain filter, group information or transmission parameter setting of DL signal(s) may be determined according to the recommended RS or transmission parameter setting.

When UE receives the gNB response (e.g., a DCI, MAC-CE or RRC command), the UL signal(s) may be transmitted according to recommended RS or transmission parameter setting. In some embodiments, the spatial relation, group information or transmission parameter setting of UL signal(s) may be determined according to the recommended RS or transmission parameter setting.

The UE can report the recovery event corresponding to RS or transmission parameter setting by a UCI, MAC-CE or RRC signaling (e.g., automatic recovery or effective event of virtual anchor or TRP). The report may indicate the recovered RS or recovered transmission parameter setting for assisting the subsequent beam management and data transmission or time stamp of predictable beam recovery. In some embodiment, the report includes the channel state information (CSI) corresponding to the recovered RS or recovered transmission parameter setting. In some embodiments, the channel state information (CSI) corresponding to the recovered RS or recovered transmission parameter setting may be superior to or not inferior to a threshold.

When UE receives the gNB response, the DL signal(s) may be received according to recovered RS or recovered transmission parameter setting. In some embodiments, the QCL assumption, spatial domain filter, group information or transmission parameter setting of DL signal(s) may be determined according to the recovered RS or recovered transmission parameter setting. For instance, the DL signal (e.g., CSI-RS) may be received by the UE for probing the recovered beam link, such as DL beam refinement.

When UE receives the gNB response, the UL signal(s) may be transmitted according to recovered RS or recovered transmission parameter setting. Furthermore, the spatial relation, group information or transmission parameter setting of UL signal(s) may be determined according to the recovered RS or recovered transmission parameter setting. For instance, the UL signal (e.g., SRS) may be transmitted by the UE for probing the recovered beam link, like UL beam refinement.

Figure 7:
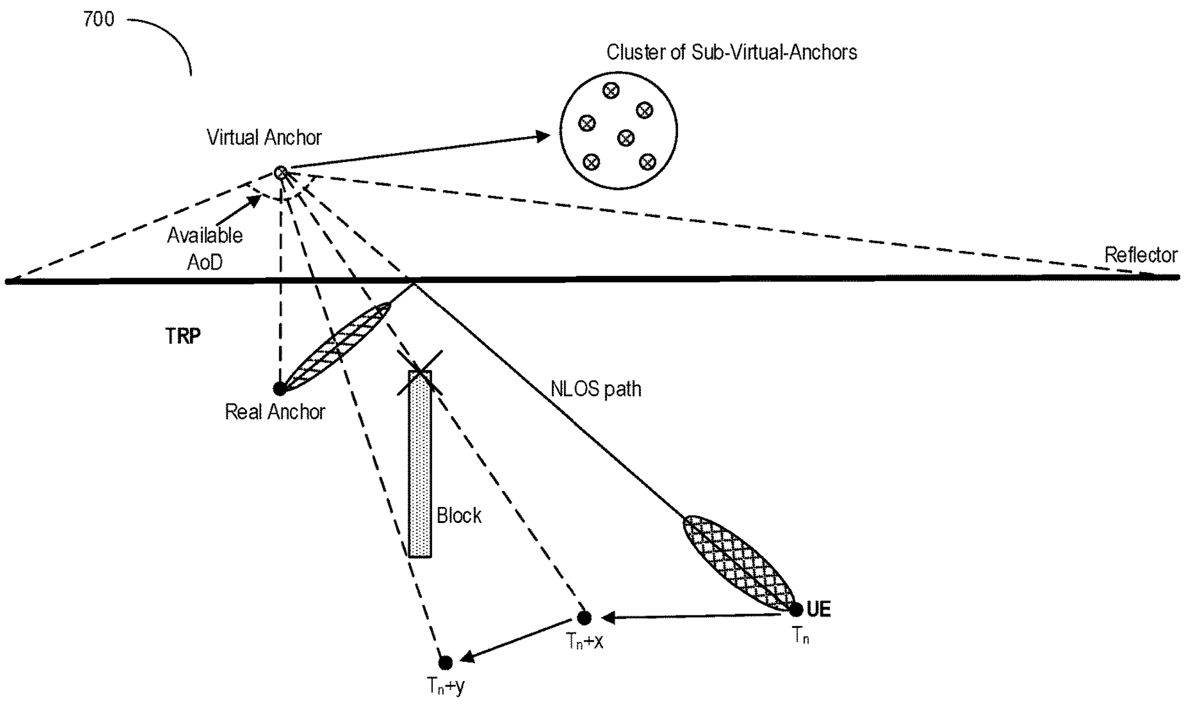
FIG. 7 illustrates a block diagram of a system for living and death procedure of beam/link (e.g., determining/predicting/projecting whether a LOS/NLOS transmission link is connected or disconnected due to potential blockage, etc.) with assistance of virtual anchor in accordance with an illustrative embodiment.

Referring now to FIG. 7, depicted is a block diagram of a system 700 for living and death procedure of beam/physical link with assistance of virtual anchor. As depicted, one link failure or active procedure of beam and physical link can be found. When UE moves from $T_n$ to $T_n$+x, based on the transmission parameter setting, the UE can estimate the beam pair link may be failed, and then report this event to TRP in advance. Then, when the UE moves from $T_n$+x to $T_n$+y, the original link may be recovered automatically, and then the UE can report the recovery event corresponding to the transmission parameter setting (e.g., the virtual anchor).

VI. Process for Performing Sensing Information Assisted Beam Management

Figure 8:
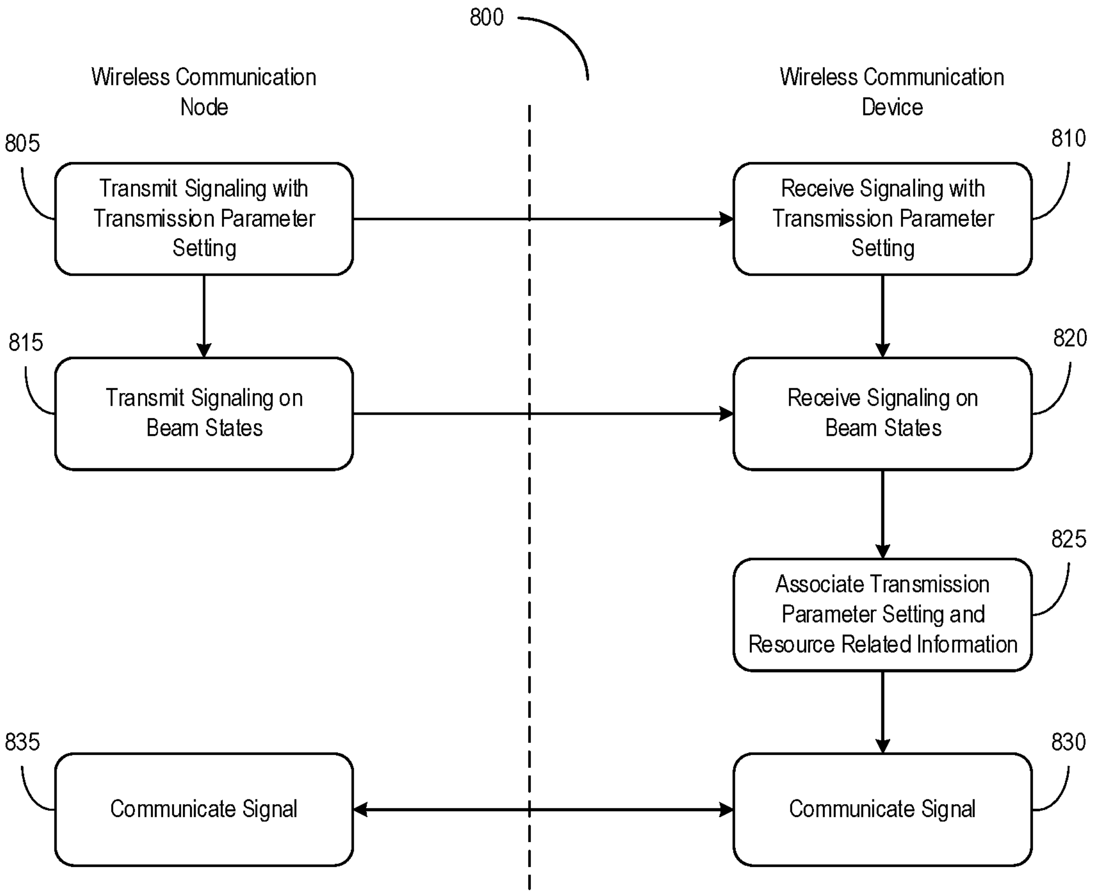
FIG. 8 illustrates a flow diagram of a method for performing sensing information assisted beam management in accordance with an illustrative embodiment.

Referring now to FIG. 8, depicted is a method 800 for performing sensing information assisted beam management. The method 800 may be implemented using or performed by any of the components detailed above, such as the UE 104 or 204 and BS 102 or 202, among others. In brief overview, a wireless communication node may transmit signaling including a transmission parameter setting (805). A wireless communication device may receive the signaling including the transmission parameter setting (810). The wireless communication node may transmit a signaling on beam states (815). The wireless communication device may receive the signaling on beam states (820). The wireless communication device may associate the transmission parameter setting and resource related information (825). The wireless communication device may communicate a signal with the communication node (820 and 825).

In further detail, a wireless communication node (e.g., BS 102 and 202) may send, provide, or otherwise transmit a signaling (sometimes referred herein as a first signaling) including at least one transmission parameter setting to a wireless communication device (e.g., UE 104 and 204) (805). The signaling may be transmitted to provide one or more transmission parameter settings to the wireless communication device to perform sensing information assisted beam management. In some embodiments, the signaling may be or include an uplink (UL) signal between the wireless communication node and the wireless communication device. In some embodiments, the signaling may be or include an downlink (DL) signal between the wireless communication node and the wireless communication device. In some embodiments, the signaling may be in accordance with various types of signaling, such as a system information block (SIB) signalling, master information block (MIB) signalling, medium access control control element (MAC-CE) signaling, or radio resource control (RRC) signaling.

The signaling may indicate, define, or otherwise configure the one or more transmission parameter settings available to the wireless communication device. The transmission parameter setting may define, correspond to, or otherwise represent sensing information associated with an anchor. The anchor may be a virtual anchor or a physical anchor. The virtual anchor may be for assisting beam determination by the wireless communication device. The physical anchor may correspond to a transmission/reception point (TRP), such as the wireless communication node or another communication node. In some embodiments, the signaling may identify or include a pool of transmission parameter settings. The pool may identify or include the one or more transmission parameter settings. The pool of transmission parameter settings may be associated with a pool of beam states. In some embodiments, each transmission parameter setting may correspond to or be associated with a group of reference signals (RSs). In some embodiments, the transmission parameter setting may sensing information related to each of a set of sub-entities of the anchor.

The transmission parameter setting may define, identify, or include location information. The location information may identify or include a location of the anchor, a location of a reflector, and a location of a blockage. The reflector may correspond to a plane along which a beam communicated between the wireless communication node and the wireless communication is reflected or change in direction. The block may correspond to an object between the wireless communication node and the wireless communication device affecting the communication of the beam.

The transmission parameter setting may also define, identify, or include size information. In some embodiments, the size information may identify or include a radius or a length, for example, defining the anchor, TRP, or reflector, among others. The radius and length may be defined in terms of two-dimensions or three-dimensions. In some embodiments, the size information may identify or include a size of the anchor, the reflector, or the blockage. The size may be in terms of two-dimensions or three-dimensions. In addition, the transmission parameter setting may define, identify, or include a range of angles. The range of angles may identify or include an available range of angles for the anchor. The range of angles may identify or include a range of angle of arrival (AoA) relative to the anchor. The range of angles may identify or include a range of angle of departure (AoD) relative to the anchor.

The transmission parameter setting may also define, identify, or include spread information. The spread information may relate or otherwise correspond to the location information, the size information, or the range of angles. The spread information may define, indicate, or otherwise include a range of values for the various types of the location information, the size information, or the range of angles as described above. In some embodiments, the spread information for the range of angles may identify or include an angular spread. The angular spread may define, identify, or include an azimuth angle spread of arrival, a zenith angle spread of arrival, an altitude angle spread of arrival, an azimuth angle spread of departure, a zenith angle spread of departure, or an altitude spread angle spread of departure, among others. In some embodiments, the sensing information related to the each sub-entity for the anchor may identify or include location information, size information, or a range of angles for the sub-entity.

The wireless communication device may retrieve, identify, or otherwise receive the signaling including the transmission parameter setting from the wireless communication node (810). Upon receipt, the wireless communication device may parse the signaling to extract or identify the transmission parameter setting. With the identification, the wireless communication device may identify the location information, the size information, or the range of angles. In some embodiments, the wireless communication device may wait for another signaling to initiate sensing information assisted beam management, upon receipt of the first signaling. In some embodiments, the wireless communication device may initiate the sensing information assisted beam management in response to receipt of the signaling.

The wireless communication node may send, provide, or otherwise transmit a signaling on beam states to the wireless communication device (815). In some embodiments, the wireless communication node may transmit a signaling to activate (or deactivate) a subset of a pool of beam states. The signaling may identify the subset of the pool of beam states to be activated (or deactivated). The subset of pool of beam states may correspond to a subset of a pool of transmission parameter settings. In some embodiments, the signaling may correspond, map, or associate the plurality of beam states with a code point. The plurality of beam states may be associated with at least one of the transmission parameter settings. In some embodiments, the plurality of beam states includes a first set of beam states to be applied to downlink signals, and a second set of beam states to be applied to uplink signals. In some embodiments, the signaling may specify, identify, or otherwise indicate a beam state from the subset of the pool of beam states. The beam state may be applied to the downlink signaling or uplink signaling. In some embodiments, the signaling may identify or include a downlink control information (DCI) signaling, a medium access control control element (MAC-CE) signaling or a radio resource control (RRC) signaling, among others. When the wireless communication node receives the gNB response (e.g., a DCI, MAC-CE or RRC command), the signaling may be received according to a recommended RS or transmission parameter setting.

The wireless communication device may retrieve, identify, or otherwise receive the signaling on beam states from the wireless communication node (820). In some embodiments, the wireless communication device may receive the signaling to activate (or deactivate) the subset of pool beam states. Upon receipt, the wireless communication device may parse the signaling to identify the subset of pool beam states to be activated. In some embodiments, the wireless communication device may receive the signaling to indicate a beam state from the subset of the pool of beam states. When received, the wireless communication device may parse the signaling to identify the beam state from the subset.

The wireless communication device may correspond, map, or otherwise associate the transmission parameter setting and resource related information (825). The resource related information may identify or include a reference signal (RS), a beam state, group information, a reporting configuration, a bandwidth part (BWP), a component carrier (CC), a control resource set (CORESET) pool, or an uplink power control parameter, among others. The group information may include or correspond grouping of the one or more RSs, resource set, panel, sub-array, antenna group, antenna port group, group of antenna ports, beam group, transmission entity/unit, or reception entity or unit, among others. In some embodiments, RS may identify or include a RS port, a RS group, a RS resource, a RS resource set, or a RS resource setting, among others. In some embodiments, RS may identify or include synchronization signal blocks (SSBs) or channel state information reference signals (CSI-RSs). In some embodiments, the RS may be associated with one or more of the transmission parameter sets.

In associating, the wireless communication device may determine the transmission parameter settings using the subsequent signaling. In some embodiments, the wireless communication device may identify or determine the transmission parameter settings associated with the indicated beam state. The beam state may have been indicated in the subsequent signaling. In some embodiments, the wireless communication device may identify, select, or determine at least one transmission parameter setting from the plurality of transmission parameter settings. The at least one transmission parameter setting may be determined to be effective and to be applied to the signal for beam management. In some embodiments, the wireless communication device may identify or select the transmission parameter setting to use from the pool of transmission parameter settings.

The wireless communication device may communicate a signal with the communication node (830 and 835). In some embodiments, the wireless communication device may send, transmit, or communicate the signal in accordance with the resource related information. In some embodiments, the wireless communication device may send, transmit, or communicate the signal in accordance with the transmission parameter setting. In communicating, the wireless communication may transmit or communicate the RS. The RS may be configured with the beam state or the group information. The beam state or the group information may be associated with the transmission parameter setting. The transmission parameter setting can be included in or associated with the beam state or the group information. In some embodiments, the signal including the RS may be associated with the transmission parameter setting identified to be used. The RS may be used for beam detection, radio link monitoring, candidate beam identification, beam recovery, or link recovery, among others. In some embodiments, the signal may include a downlink signal (e.g., for data or control channels such as PDCCH or PDSCH) or an uplink signal (e.g., for data or control such as PUCCH or PUSCH).

In communicating, the wireless communication device may retrieve, identify, or otherwise receive a downlink signal according to the RS or the transmission parameter setting. The downlink signal may be received from the wireless communication node. In some embodiments, a beam state, spatial relation, spatial domain filter, or group information of the downlink signal may be determined (e.g., by the wireless communication node) according to the RS or the transmission parameter setting. In some embodiments, the wireless communication device may also send, provide, or otherwise transmit an uplink signal according to the RS or the transmission parameter setting. The uplink signal may be transmitted to the wireless communication node. In some embodiments, a beam state, spatial relation, group information, or spatial domain filter of the uplink signal may be determined (e.g., by the wireless communication device) in accordance with the RS or the transmission parameter setting.

In some embodiments, the wireless communication device may send, provide, or otherwise transmit a report (e.g., to the wireless communication node). In some embodiments, the wireless communication device may carry out or perform a measurement corresponding to the reporting configuration in accordance with the transmission parameter setting. The measurement may be included in the report sent by the wireless communication device. The report may be part of or may include an uplink control information (UCI) signaling, a medium access control control element (MAC-CE) signaling or a radio resource control (RRC) signalling, among others.

The report may identify or include an event with respect to the RS or transmission parameter setting. In some embodiments, the report may identify or include a failure event corresponding to the RS or the transmission parameter setting. In some embodiments, the report may identify or include a recovery event corresponding to the RS or the transmission parameter setting. The report may identify or include information regarding the RS or the transmission parameter setting. In some embodiments, the report may identify or include an indication of the RS or the transmission parameter setting, or a time stamp for beam failure or beam recovery. In some embodiments, the report may identify or include channel state information (CSI) corresponding to the RS or the transmission parameter setting.

In some embodiments, the RS (e.g., referred to in the report) may correspond to a failed RS or a candidate RS. In some embodiments, the transmission parameter setting may correspond to a failed transmission parameter setting or a candidate transmission parameter setting. The candidate transmission parameter setting may correspond to a recovered transmission parameter setting. In some embodiments, the CSI (e.g., identified in the report), may meet or may exceed a threshold. In some embodiments, the report may identify or include an indication that a candidate RS or a candidate transmission setting is absent.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

The invention claimed is:

1. A method comprising:

receiving, by a wireless communication device from a wireless communication node, a first signaling that includes a transmission parameter setting comprising location information defining (i) a first location of an anchor and (ii) a second location of an object along a transmission path affecting a beam for communications between the wireless communication node and the wireless communication device;

associating, by the wireless communication device, the transmission parameter setting and resource related information; and communicating, by the wireless communication device with the wireless communication node, a signal according to the resource related information or the transmission parameter setting, wherein the transmission parameter setting represents sensing information associated with the anchor for assisting beam determination by the wireless communication device.

2. The method of claim 1, wherein the signal comprises at least one of a downlink signal or an uplink signal.

3. The method of claim 1, wherein the transmission parameter setting comprises at least one of size information or a range of angles.

4. The method of claim 3, wherein the second location comprises at least one of a location of a reflector, or a location of a blockage.

5. The method of claim 3, wherein the size information comprises at least one of:

at least one of a radius or a length; or size information of the anchor, a reflector, or a blockage.

6. The method of claim 3, wherein the range of angles comprises at least one of:

an available range of angles of at least one of: the anchor; or at least one of a range of an angle of arrival (AoA), or a range of an angle of departure (AoD).

7. The method of claim 1, wherein the transmission parameter setting comprises information related to each of a plurality of sub-entities of the anchor.

8. The method of claim 1, wherein the anchor comprises a virtual anchor or a physical anchor.

9. The method of claim 1, wherein the transmission parameter setting comprises spread information that corresponds to location information, spread information that corresponds to size information or spread information that corresponds to angle.

10. The method of claim 1, wherein the transmission parameter setting comprises spread information that corresponds to angle, and wherein the spread information that corresponds to angle comprises angular spread.

11. The method of claim 10, wherein the angular spread comprises at least one of: azimuth angle spread of arrival, zenith angle spread of arrival, azimuth angle spread of departure, or zenith angle spread of departure.

12. The method of claim 1, wherein the first signaling comprises: system information block (SIB) signaling, master information block (MIB) signaling, medium access control control element (MAC-CE) signaling or radio resource control (RRC) signaling.

13. The method of claim 1, wherein the resource related information comprises at least one of: a reference signal (RS), a beam state, group information, a reporting configuration, a bandwidth part (BWP), a component carrier (CC), a control resource set (CORESET) pool, or an uplink power control parameter.

14. The method of claim 13, wherein the RS comprises at least one of: a RS port, a RS port group, a RS resource, a RS resource set, or a RS resource setting.

15. The method of claim 13, wherein the RS comprises a demodulation reference signal (DMRS), a sounding reference signal (SRS), a synchronization signal block (SSB) or a channel state information reference signal (CSI-RS).

16. The method of claim 13, wherein the transmission parameter setting is associated with a group of the RSs.

17. A method comprising, transmitting, by a wireless communication node to a wireless communication device, a first signaling that includes a transmission parameter setting comprising location information defining (i) a first location of an anchor and (ii) a second location of an object along a transmission path affecting a beam for communications between the wireless communication node and the wireless communication device;

causing the wireless communication device to associate the transmission parameter setting and resource related information; and communicating, by the wireless communication node with the wireless communication device, a signal according to the resource related information or the transmission parameter setting, wherein the transmission parameter setting represents sensing information associated with the anchor for assisting beam determination by the wireless communication device.

18. A wireless communication device, comprising:

at least one processor configured to:

receive, via a transceiver from a wireless communication node, a first signaling that includes a transmission parameter setting comprising location information defining (i) a first location of an anchor and (ii) a second location of an object along a transmission path affecting a beam for communications between the wireless communication node and the wireless communication device;

associate the transmission parameter setting and resource related information; and communicate, via the transceiver with the wireless communication node, a signal according to the resource related information or the transmission parameter setting, wherein the transmission parameter setting represents sensing information associated with the anchor for assisting beam determination by the wireless communication device.

19. A wireless communication node, comprising, at least one processor configured to:

transmit, via a transceiver to a wireless communication device, a first signaling that includes a transmission parameter setting comprising location information defining (i) a first location of an anchor and (ii) a second location of an object along a transmission path affecting a beam for communications between the wireless communication node and the wireless communication device;

cause the wireless communication device to associate the transmission parameter setting and resource related information; and communicate, via the transceiver with the wireless communication device, a signal according to the resource related information or the transmission parameter setting, wherein the transmission parameter setting represents sensing information associated with the anchor for assisting beam determination by the wireless communication device.

* * * * *